United States Patent
Avery et al.

(10) Patent No.: US 12,530,955 B2
(45) Date of Patent: Jan. 20, 2026

(54) FLOOD MONITORING UNIT AND SYSTEM

(71) Applicant: Simplicity Integration, LLC, Spicewood, TX (US)

(72) Inventors: Mark J. Avery, Sugarland, TX (US); Stephen R. Tennis, II, Richmond, TX (US); Michael M. Reese, Sunnyvale, TX (US)

(73) Assignee: Simplicity Integration, LLC, Houston, TX (US)

( * ) Notice: Subject to any disclaimer, the term of this patent is extended or adjusted under 35 U.S.C. 154(b) by 0 days.

(21) Appl. No.: 18/479,725

(22) Filed: Oct. 2, 2023

(65) Prior Publication Data

US 2024/0144805 A1    May 2, 2024

Related U.S. Application Data

(63) Continuation of application No. 17/546,038, filed on Dec. 8, 2021, now Pat. No. 11,776,376.

(60) Provisional application No. 63/122,908, filed on Dec. 8, 2020.

(51) Int. Cl.
    *G08B 21/10*    (2006.01)

(52) U.S. Cl.
    CPC .................................. *G08B 21/10* (2013.01)

(58) Field of Classification Search
    CPC .............................. G08B 21/10; G08B 21/20
    See application file for complete search history.

(56) References Cited

U.S. PATENT DOCUMENTS

| 8,653,967 | B1 * | 2/2014 | Vosburgh | B63B 22/18 340/3.1 |
|---|---|---|---|---|
| 2004/0084359 | A1 * | 5/2004 | Pasko | G01F 23/268 210/97 |
| 2018/0224314 | A1 * | 8/2018 | Yoshida | G01F 23/804 |
| 2020/0064175 | A1 * | 2/2020 | Krammer | G01F 23/14 |

FOREIGN PATENT DOCUMENTS

| JP | H1181253 A | * | 3/1999 |
| JP | 2018087814 A | * | 6/2018 |

* cited by examiner

*Primary Examiner* — An T Nguyen
(74) *Attorney, Agent, or Firm* — Marc A. Hubbard; Hubbard Law, PLLC

(57) ABSTRACT

An integrated flood monitoring unit comprises a sensor capable of at least detecting one or more floodwater levels or measuring water levels and assembly of a data acquisition module, and a wireless transmitter that is specially adapted to be mounted one top and at least partially inside of a hollow pole secured in a vertical orientation at a fixed geographical location to monitor water levels, with the sensor being located nearer the bottom of the pole.

14 Claims, 10 Drawing Sheets

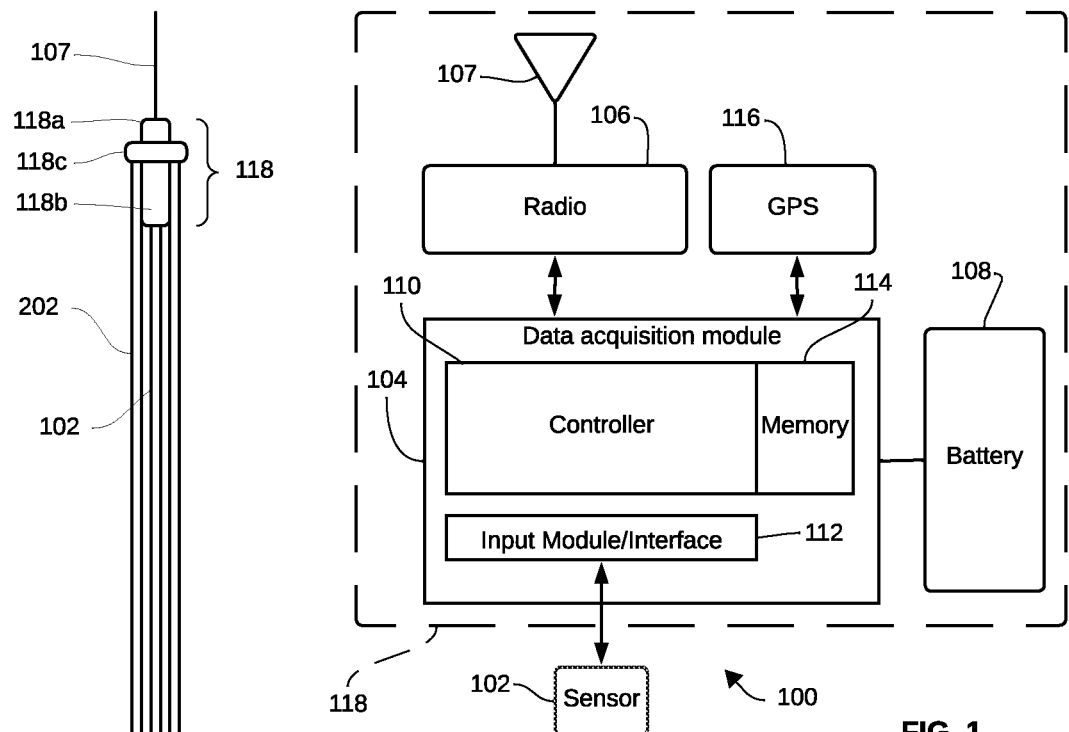
FIG. 1
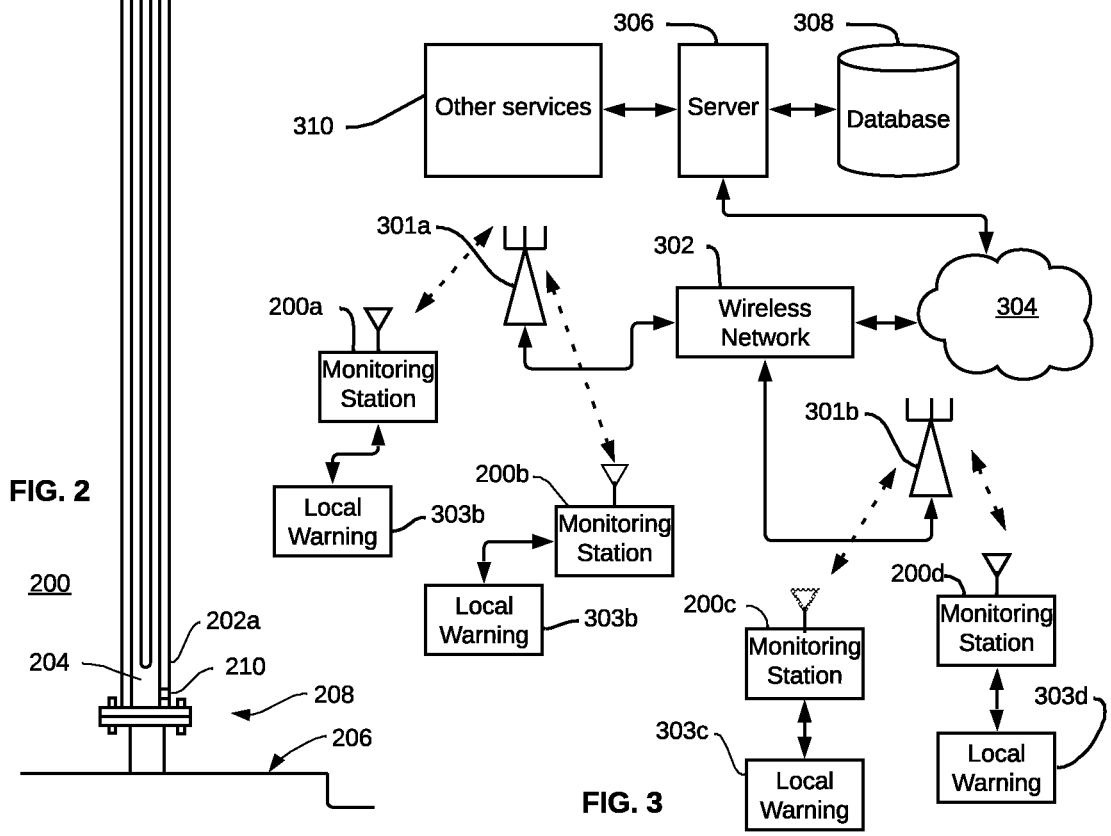
FIG. 2
FIG. 3

Houston HQ Detailed Device Setup

Sensor Set-up for Serial Number: 3421466599

Model Number: GPS-P111N-VL-IS-G

Add user defined name (optional): Houston_SE

Add user defined group (optional): Lower Water Auth

Dry ▼ ← 714

Installation Type: Above Grade | Below Grade

[?]

Diagram showing Level Grade 0", DRY — 716

BACK | NEXT

HOME

FIG. 7C

| HOME | |
|---|---|
| Houston HQ Device Setup | |

Sensor Setup for Device Serial # | 3421466599

Setup Summary: CONGRATULATIONS - SETUP COMPLETE!

| | |
|---|---|
| User Company | Houston HQ |
| GPS Location | Lat: 30.0277°   Long: -95.2589° |
| Serial # | 3421466599 |
| Model | GPS-P111N-VL-IS-G |
| User Defined Name | Houston_SE |
| User Defined Group | Lower Water Auth |
| Location Type | Bridge |
| Installation Type | WET |
| Alarms Set | DISABLED |
| Setup Time/Date | 10-21-21 14:51 |
| Battery Status | Healthy |
| Configured By | Simp_admin |

BACK    NEXT

FIG. 7E

FLOOD MONITORING UNIT AND SYSTEM

RELATED APPLICATION

This application claims priority to U.S. provisional patent application No. 63/122,908, filed Dec. 8, 2020, which is incorporated herein by reference for all purposes.

FIELD OF INVENTION

The invention pertains to remote flood monitoring systems.

BACKGROUND

Flooding is the nation's leading natural disaster, accounting for the greatest loss of life, property damage, and economic impact. Current flood detection and monitoring systems rely on the complex and expensive installation of field instrumentation and data networks that are not always reliable.

SUMMARY

The invention generally relates to equipment and systems for monitoring and warning of floodwater, aspects of which may have a particular advantage for monitoring for flood water in locations such as road crossings, dry riverbeds, coastal areas, weirs, levies, retention ponds, and basins that are used in water management to move or mitigate water during a potential flood event, and other, low-lying terrain that may flood after heavy rains or other natural events, particularly those areas prone to flash flooding, as well as urban or heavily populated areas.

Representative examples of an integrated flood monitoring unit described herein embody several advantageous aspects, any one or more of which may be used in a remote flood monitoring unit, comprises a sensor capable of at least detecting one or more floodwater levels or measuring water levels, a data acquisition module, and a wireless transmitter. The data acquisition module reads and stores readings from the sensor. The data acquisition module then sends messages based on or containing one or more readings and, optionally, other parameters using the wireless transmitter to a remote server.

In one such aspect, the sensor, data acquisition device, and wireless transmitter form an assembly that is specially adapted to be mounted at least partially inside of a hollow pole that is planted into the ground or secured to another structure (such as a road, sidewalk, bridge, or building) in a vertical orientation and at a fixed geographical location to monitor water levels, such as where flooding may occur, with the sensor being located nearer the bottom of the pole and connected to a housing assembly comprised of one or more enclosures containing the battery, data acquisition module, and wirelessly transmitted mounted nearer to the top or on top of the pole. Placement of the unit within and on top of the pole will discourage its theft or damage. Optionally, the housing assembly can be secured to the top of the pole with a fastener to discourage theft and prevent accidental removal.

In another aspect, the sensor is adapted for placement inside the hollow center of a pole, nearer to the bottom of the pole, with the pole having one or more holes permitting ingress of water into the hollow center of the pole for enabling the sensor to detect one or more levels of water. Optionally, the sensor is installed by inserting it through an opening in the top pole after the pole is mounted In yet another aspect, the data acquisition unit, battery, and wireless transmitter and receiver are adapted for mounting partially or entirely within the hollow center of a pole, nearer to its top, or on top of the pole in one or more enclosures comprising a housing assembly. The pole may be a newly installed pole or a pole previously installed for the same or other purposes, such as a pole supporting a sign containing traffic, directional information, or any other type of information for vehicles on roadways or elsewhere. The new pole may also be affixed, such as by a clamp, bolt, or other attachment device, to a preexisting pole used for this or other purposes or other preexisting structure. Optionally, the sensor is adapted to be connected with and/or suspended from one or more of the components of the housing assembly to a point lower inside the pole, nearer to its lower end. The assembly of the sensor and the housing assembly is, preferably but not necessarily, capable of being installed into a new or existing hollow pole by inserting the sensor through the open top end of the pole and then mounting the one or more enclosures of the housing assembly on top of the pole or, optionally, partially inside the hollow center of the pole. The sensor may be inserted first and then connected to an electronics enclosure or preassembled into a single unit that can be inserted without requiring additional connections to speed up and/or simplify installation in the field.

Optionally the sensor and the part of the housing assembly mounted at the top of the pole have a predetermined spatial relationship that positions the sensor a known distance from the top of the pole and/or the ground at its location. Alternatively, or in addition, the spatial relationship between the sensor and the one or more electronics enclosures can be adjusted in the field, before installation on a pole, to select between two or more predetermined positions. The predetermined relationship can enable the distance of the sensor either above the ground or, if the elevation of the ground and/or the housing assembly is known (e.g., seal level), the elevation of the water level sensor to be determined.

Optionally, the unit may incorporate a GPS receiver, which can report the coordinates and, optionally, the elevation of the unit (and thus its sensor) to a remote server after it has been powered up.

Optionally, the integrated flood monitoring unit may also have associated with it a local visual and/or audible warning system, which may be integrated with the flood monitoring unit (within the same enclosure or one that is physically attached) or a separate component in close vicinity that is connected by wire or wirelessly.

In other aspects, the flood monitoring unit is adapted for installation on a signpost constructed of a metallic or polymer that meets applicable legal standards and requirements. Such a signpost will typically have, for example, a breakaway design and one or more perforations or holes at the bottom of the pole or along the side of the pole that permit ingress and egress of water. The post may have round, square, or other cross-sectional shape. Signposts that comply with applicable regulations can be placed adjacent to roads. The signpost can be new or preexisting. The adaptation or configuration of the flood monitoring unit to installation signposts make installation of flood monitoring units at low water crossings, roadways, intersections, and flood-prone areas easier and potentially less expensive as compared to other flood monitoring stations. This includes, in particular, installation in urban areas, near residential housing and commercial building, adjacent to roadways, sidewalks, or walkways. Furthermore, existing procedures for installing signposts are well known and can be used when installing the flood monitoring units. A flood monitoring thus can be installed on a new or existing road sign, non-limiting, representative examples of which include flood gauge signs, stop signs, yield signs, and other roadside signs, in addition to the option of installing the flood monitoring unit on a standalone pole where measurement is needed.

Additional advantages that can be achieved through the incorporation of a flood monitoring unit with a pole, particularly a signpost, as described in this specification and accompanying drawings, include protection of sensitive components of the monitoring device from weather and deterrence of theft and vandalism. Furthermore, a flood monitoring unit, and in particular its water level sensor, inside a pole planted into the ground or affixed to a roadway or sidewalk, is less likely to move or be dislocated during a flooding event, resulting in more reliable and stable measurements and results because the sensor remains at a fixed point (in terms of its geographical coordinates and elevation). To improve deterrence of theft and vandalism, one or more of the components of the flood monitoring unit, or two or more or all the components, if integrated into a single assembly, components may, optionally, be attached physically to the pole with any combination of threads, brackets or locking device, preferably ones that are tamper resistant.

BRIEF DESCRIPTION OF THE DRAWINGS

FIG. 1 is a schematic diagram of a pole on which a flood monitoring unit is mounted.

FIG. 2 is a schematic diagram of a representative, non-limiting example of an arrangement of the basic functional components of the flood monitoring unit of FIG. 1.

FIG. 3 is a schematic diagram illustrating conceptually a representative, non-limiting arrangement of flood monitoring units installed on poles, such as the one illustrated by FIG. 1, and the communication networks through which they may form a connection to a remote service for collecting and analyzing data from multiple flood monitoring units in a given geographic area.

FIGS. 7A to 7G are representative examples of a user interface in the form of pages from a web portal for guiding an installer through the installation of a monitoring unit using the process of FIG. 6.

DETAILED DESCRIPTION OF EXEMPLARY EMBODIMENTS

Figure 4:
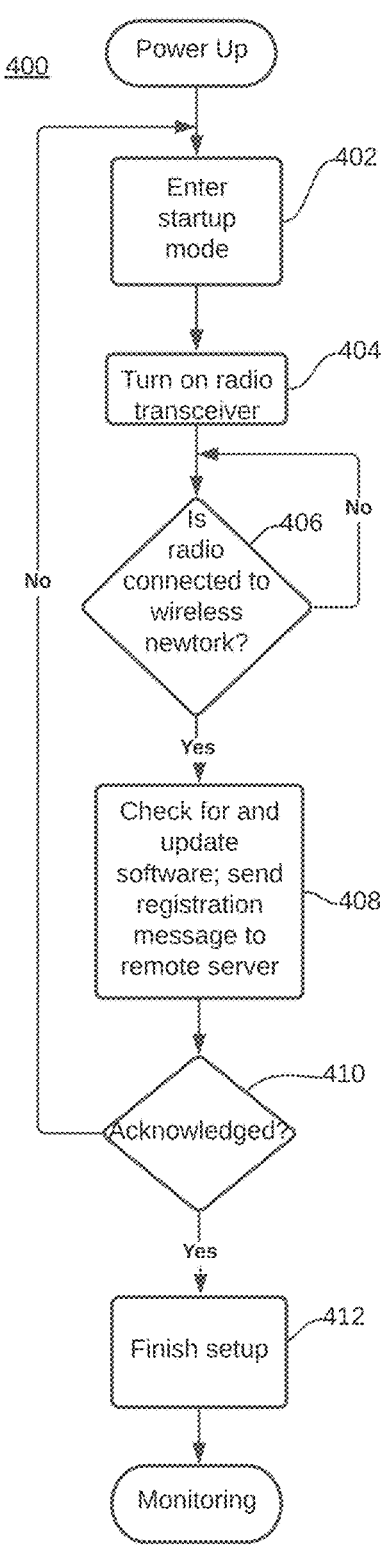
FIG. 4 is a flow diagram of certain steps of a process of a flood monitoring unit automatically joining a network of flood monitoring units following installation.

In the following description, like numbers refer to like elements.

FIG. 1 schematically illustrates several primary components of a representative example of a flood monitoring unit 100. The flood monitoring unit is comprised of a water level sensor 102 and a data acquisition module 104 that includes a wireless communications interface or radio 106 and one or more input modules or interfaces 112 that receive signals from the sensor 102 indicative of a sensed water level and, optionally, provide power and other signals to the sensor 102. Electrically coupled with the radio is an antenna 107 for enabling transmission and reception of electromagnetic signals. The flood monitoring unit 100 also includes a power supply system (not shown) for supplying power to the sensor, data acquisition module, radio, and other subsystems and components that require electrical power. The power supply, which also regulates voltages and conditions current, as well as manages the power source, may include battery 108, either as a primary (preferred for reducing the complexity of installation and avoiding any requirement for a power source where it is deployed) or a backup source of electrical power. If desired, the battery can be rechargeable, such by a solar panel or in any other way, such as by a fixed electrical power receptacle.

A non-limiting example of a suitable data acquisition module is a remote terminal unit (RTU), such as those used in SCADA systems. However, various aspects of the flood monitoring unit 100 discussed below are not, unless otherwise specifically noted, limited to, and do not depend on the particular implementation chosen for the data acquisition module.

The data acquisition module is, in general terms, comprised of a controller 110. The controller can take the form of, for example, a field-programmable gate array (FPGA), an application-specific integrated circuit (ASIC), a programmed logic controller (PLC), a programmed microcontroller, or a microprocessor. In each case, the controller is configured or programmed to perform logic operations to carry out processes relating to reading the water level sensor 102, storing the readings, communicating the readings and other operational parameters through the radio 106 to a remote service, and receiving and processing commands received through the radio 106, including the representative processes described below. Such controllers are typically implemented as a monolithic, integrated circuit or chip, or as part of a system on a chip that contains additional components. Depending on the implementation, the logic is hardwired on the chip (in the case of an FPGA, the connections are hardwired by programming the device) or stored in memory as a program of software instructions that are executed by the controller according to the program's flow. The controller may include onboard memory for storing program instructions and/or data, including sensor readings. It may also make use of additional memory that is not on the same chip as the controller. Temporary and permanent storage for data and software—in the controller and/or in an external memory circuit (on the same or different chip)—is functionally represented by memory 114.

The one or more input modules or interfaces 112 can be implemented as one or more integrated circuits mounted to a circuit board with a controller. It may also be integrated with the controller onto a single chip. The radio 106 and optional geolocation system 116, an example of which is a global positioning system (GPS) receiver or transceiver, may be implemented as separate integrated circuits or chips mounted on the same circuit board as the controller. Other types of geolocation systems capable of determining the location or position of the flood monitoring unit may be used instead of or in addition to a GPS receiver or transceiver. Non-limiting, representative examples of possible geolocation systems other than GPS include any type of wireless geolocation systems, including those that receive RF signals from terrestrial transmitters with known or mapped locations, such as WiFi base stations, cellular network base stations, or other wireless network base stations, and calculate a position from one or more of attributes of the received signals, such as signal strength signal angle of arrival, strength, time of arrival, time difference of arrival, or other attributes using techniques such as triangulation and trilateration.

The electronic components—the data acquisition module 104, radio 106, and optional geolocation system 116—are housed in one or more enclosures to protect them from damage from the environment and vandalism. Preferably, these components are integrated into a housing assembly 118, even if they might be housed in separate enclosures within the housing assembly 118. The battery 108 may be housed within housing assembly 118, optionally within a dedicated compartment, within or in a separate enclosure. The housing 118 is configured for mounting on or near the top of a hollow pole in the field.

Referring now also to FIG. 2, which schematically illustrates a representative, non-limiting example of a flood monitoring station 200 comprising a flood monitoring unit, such as flood monitoring unit 100, mounted to a vertical pole that has been installed in the field at a monitoring location. A pole is comprised of an elongated, hollow structure that is capable of being held in vertical by attaching a lower end to the ground or horizontal surface of the adjacent structure. It may also be held in a vertical orientation using brackets or similar structures that extend from a vertical surface of an adjacent structure.

Illustrated is an embodiment of a housing assembly 118 that is comprised of a representative example of an enclosure for at least the data acquisition module 104 and other electronics such as radio 106 and geolocation system 116. The battery 108 or other power supply may be located in the same or in a different enclosure that is located within the hollow center of the pole or elsewhere and attached to the housing assembly 118 or the pole. In this embodiment, the housing assembly 118 is adapted or configured to have a shape and size that enables it to be at least partially inserted into a hollow center of a signpost 202, which is an example of a type of hollow pole suitable for use with the flood monitoring unit 100. The signpost 202 shown in a cross-section taken along its center axis. Its hollow center 204 extends from an opening in the top end to the bottom end of the signpost.

As compared to other types of poles, a signpost that meets applicable legal or industry standards, such as those of American Association of State Highway Transportation Officials (AASHTO) or regulations of the Department of Transportation or other regularly agency for highways and roads that limit excessive damage to vehicles that collide with them, and their passengers offers the advantage of being placeable adjacent to or near streets and highways. Such a signpost can be constructed of metal, a polymer, or a composite material that meets applicable government standards for placement adjacent a roadway. Furthermore, using such a signpost allows for widely known installation methods and requirements to be employed, making installation of flood monitoring stations easier and possibly less expensive because of the ready availability of the signpost, known installation method, and persons trained to install them as compared to special or unique structures for mounting flood monitoring units.

In the illustrated embodiment, signpost 202 includes a breakaway connection 208, which attaches the main section 202a of the signpost to a stump portion 202b that is partially buried in concrete and, optionally, placed at a known height above the ground. The stump may also be directly attached to a concrete structure, such as a sidewalk or wall. The two sections are joined by screws or pins that extend through holes in a flange that extending from each section where they joined. The screws or pins will break or shear when the main section 202a is struck by a vehicle, which will reduce damage to the vehicle as compared to a signpost that does not have a breakaway mounting.

The signpost or signpost assembly may, optionally, include means for preventing or reducing the accumulation of debris, mud, or other particulates on or within the signpost and/or the sensor which would interfere with or prevent the functioning of the sensor or accurate readings by the sensor. Such means may include, for example, the use of a particular chemical composition or coating in the structure of the signpost and/or the sensor which reduces adhesion the signpost pole or the assembly of the pole assembly may, optionally, having a mech assembly preferably be self-flushing or have a coating can be fitted with either self-flushing or a chemical composition/coating to prevent or reduce any amount of debris, mud or other particulate adhering to or blocking sensor operation.

In this illustrated embodiment, a portion 118a of the housing assembly 118 fits through the opening in the top end of the hollow signpost 202, and a portion 118b extends above the top end of the signpost, to which antenna 107 is attached. A flange-like portion 118c sits against the top of the pole to correctly position the enclosure on the pole at a known height. The flange may, for example, also include an optional feature for assisting with fastening the enclosure or otherwise securing it to the pole to prevent it from falling off or impeding its theft. An example of such a feature is a sleeve or skirt-like feature that extends partially or entirely around the outside of the pole, around the edge the defines the opening I the top of the pole, which allows it to be claimed, screwed, fastened with a strap, or otherwise connected to the pole. In the alternative, most or all the housing assembly 118 could be inserted into the hollow center of the enclosure, with the antenna 107 extending from the top and secured with tamper-resistant bolts, screws, straps, and/or clamps.

The water level sensor 102 is, in one embodiment, adapted for installation inside the hollow center of a pole. The water level sensor is, in one embodiment, adapted to measure the level of water within the hollow center of the pole. Flood water surrounding the pole is permitted ingress into the hollow center through at least one or more openings located near the base of the signpost and, optionally, at points along its length. These ports are conceptually represented by port 210. In one embodiment, the air within the hollow center is displaced by rising water through openings nearer the top of the pole. However, the hollow center could be sealed above a bottom opening to use the air pressure to determine the pressure being exerted on the trapped air by the height of any water surrounding the pole.

In an alternative embodiment, a portion or all the water level sensor is be located outside the pole and connected by an electrical cable or, optionally, wirelessly, to the housing assembly 118.

In the illustrated embodiment, the water level sensor has cross-sectional dimensions and shape capable of being accommodated by the cross-sectional shape of the hollow center of the pole and can be inserted into the hollow center by inserting it through an opening at the top of the signpost. The water level sensor 102 is, in FIG. 2, schematically indicated as an elongated element that extends from the housing assembly 118 down to nearer the bottom of the signpost 202. This schematic representation is intended only to indicate an example of a possible range of water levels that, depending on the particular installation, might be desirable to measure within the hollow center of the post.

The elongated element in the figure that is representing water level sensor 102 does not, for at least several types of water level sensors that could be implemented as part of the flood monitoring unit, does not indicate the actual physical structure of the sensor.

The water level sensor 102 may comprise any type of sensor that can detect directly or indirectly a water level. It is, in one embodiment, placed within the hollow center of a pole, such as a signpost 202, preferably, but not necessarily, at a distance from the ground or at an elevation or a position relative to the signpost, the ground, or the housing assembly 118 that is known or can be determined. The water level sensor generates and/or modulates (change a physical characteristic of the signal, such as by changing an electrical signals voltage, current, frequency, or phase) one or more signals communicated to the input module or interface 112 of the data acquisition module 104 in response to sensed or detected water levels within the pole. Representative, non-limiting examples of water level sensors that may be used include those that: measure pressure or differential pressure using capacitance or strain gauges; range find using radar, including guide wave and free space radar; use lasers or fiber optics; buoyancy or magnetic floats; sonar; proximity detection; electrical conductance or capacitance; or mechanical means, such as floats connected to mechanical linkages. In one non-limiting example, the water level sensor of the flood monitoring unit comprises a pressure sensor, a guided wave radar sensor, or a combination of both.

More than one water level sensor or sensing technique may be connected with the unit and used in conjunction with the primary water level sensor to augment the unit's ability of the flood monitoring unit to document or generate an alert of abnormal water conditions. Representative and nonlimiting examples of such sensors include one or more of any the following types of sensors and combinations of them: a rain gauges and soil moisture sensors. These additional types of sensors may be installed or positioned on the same pole or other tubular structure as the water level sensor is mounted or separately and set to communicate with the flood monitoring unit using a wired or wireless connection.

A sensor that relies on radar or sonar, for example, estimates the distance to the surface of any water or, preferably, a float—for example, one constrained within the hollow pole or within a guide disposed within the hollow pole—using a transmitter positioned nearer the top of the pole to emit electromagnetic waves or sound waves and measuring the time between the emission of the waves and receiving the reflection of the waves (the return) off of the float or surface of the liquid. A proximity sensor may, for example, rely on sensing an amount and/or angle of incidence of a reflection of infrared or visible light, particularly coherent light from a source, off the surface of the water in the hollow middle of the pole or a float within the hollow pole or constrained by a guide within the hollow pole. A pressure sensor positioned nearer the bottom of the pole measures the hydrostatic pressure of a liquid head above the sensor. The higher the pressure, the greater the depth of liquid above the sensors. A mechanical sensor relies on detecting displacement of a float connected to, for example, a mechanical linkage that extends from the float to a sensor disposed near the top of the pole, such as one within housing assembly 118 or in an enclosure connected with it, that detects movement of the linkage and, based on its movement, generates or modulates an electrical signal provided to the data acquisition module indicative of the distance that the float is displaced. The coupling between the sensor that senses movement of the mechanical linkage and the mechanical linkage be mechanical, photonic, or magnetic, for example. Sensors that can detect the presence of water through a change in conductance or capacitance can also be placed at predetermined or known positions along, for example, an elongated support structure or guide that fits within the hollow center of the pole and depends from— meaning is attached to or formed with—the housing assembly 118.

An optional feature of the flood monitoring unit 100 comprises a fixed, predetermined spatial relationship between the sensor 102 and a known reference point on the housing assembly 118, the data acquisition module, or any other component within the housing assembly 118. In one example, the reference can be located after installation, such as by a visual indication that can be viewed or found by electrical, magnetic, or other means, especially if it cannot be seen after installation. Non-limiting examples of a fixed reference point include the flange, where the housing assembly 118 rests on top of the post, the top of the housing assembly, or a point visually indicated on the housing assembly corresponding to, for example, the location of the optional Geolocation system 116, a point that has a fixed and known relation with the sensor 102 or a reference point used by the sensor from which measurements are made. With this information, it is possible to determine the water level with respect to the ground, or to reference elevation, or to both, by also measuring one or determining one or more of the following. First, the distance of the reference point above the ground can be determined at or after installation by measuring the distance or because of the pole having a known or predetermined height and spatial relationship to the reference point on the housing assembly 118. Second, the geographic elevation of the reference point can be determined with the internal Geolocation system 116 (if present) and its known relationship (known because of its design) to the reference point, or by an external GPS or survey measuring the elevation of, for example, the base of the pole or the ground having a known or determinable spatial relationship with the reference point, or to the reference point itself on the housing assembly 118 or another component of the flood monitoring unit. The ground elevation could also be determined from prior surveys using the geographical coordinates of the unit, such as those measured by the internal GPS 118, an external GPS, or a survey at the time of installation.

In one, representative embodiment, the flood monitoring unit 100 is either fully assembled when delivered to an installation site or assembled from two or more components—for example, the housing assembly 118 and the sensor 102—and then inserted into a pole, such as the signpost 202. The enclosure then only needs to be secured to the pole and powered up before or after the insertion such as by removing a pin, pulling a tab, connecting power, or operating a switch. In another embodiment, the sensor 102 can be installed first and then connected to the housing assembly 118 when it is secured to the post.

With reference now Referring now to FIGS. 3 and 4, after installing the flood monitoring unit 100 on a pole, such as the signpost 202, the flood monitoring unit is powered up or turned on and automatically goes through start processes, including initialization of the electronic components and sensor. Startup process 400 (FIG. 4) is intended to be only a representative example of the basic steps of part of that process that a flood monitoring unit, such as flood monitoring unit 100, goes through automatically after it is installed at a location with a monitored geographic area 300 (FIG. 3) and switched on. After initializing, it enters a startup mode, indicated by step 402, where it can initialize its systems. It turns on its radio at step 404 to connect to a wireless network, as indicated by step 406.

In the example schematically depicted by FIG. 3, the wireless network is comprised a plurality of base stations, represented by base stations 301*a* and 301*b*, spread throughout the geographic area 300 where a plurality of flood monitoring stations, represented by flood monitoring stations 200*a*, 200*b*, 200*c* and 200*d*, a located within range of at least of the two base stations 301*a* and 301*b*. Each flood monitor station is comprised of a flood monitoring unit, such as flood monitoring unit 100, installed on a pole, such as the signpost 202, as shown in FIG. 2.

The base stations 301*a* and 301*b* are each connected to and can be considered part of a wireless network represented schematically as wireless network 302. Transmissions containing messages from one of the flood monitoring stations 200*a*-200*d* are received by the closest base station, which then forwards the message to a flood monitoring system 306.

The flood monitoring system is comprised of one or more processes performed by application software running on one or more computers. The processes may be used to manage and supervise the operation of remote flood monitoring units at floor monitoring stations 200*a*-200*d* in a given geographical area 300 or multiple geographic areas. The processes include automated processes for collecting data and reports from the flood monitoring units that are stored in one or more databases or other types of files, which are represented by database 308.

The processes if the flood monitoring system may, optionally, implement analysis and warning functions. For example, the floor monitoring system may be executing processes that automatically analyze incoming data from flood monitoring stations, such as measured water levels and other sensor readings, to detect rising and receding water conditions. Upon detection of, for example, of water levels rising, the processes may generate one or more warnings. In one embodiment, an interface to the flood monitoring system in the form a web portal may be used to display visually on a map or other visual representation the station, including, for example, a state of the station or an alert or warning associated with the station, like the ones mentioned above.

Additional applications or services 310 may access collected data and reports and/or communicate with or make use of the management, collection, or other processes of the flood monitoring system 306 to receive notices, warnings, or other information derived from collected data or to perform additional analysis.

It is expected, though not required, that messages to and from the remote monitoring units in the field will be forwarded through one or more interconnected data networks, represented by cloud 304, to which the flood monitoring system 306 and the wireless network 302 are connected. These other networks may be private or public IP networks, other types of data of networks, or a combination. Alternatively, the flood monitoring system 306 may have a direct data connection with the wireless network 302 to improve reliability.

FIG. 3 is not intended to imply any particular structure or topology for the wireless network 302, the data networks 304, or any particular implementation or interconnection of the flood monitoring system 306, database 308, and other services 310, as the details how do not directly concern the aspects of the flood monitoring unit 100 that are disclosed.

Examples of types of wireless networks or communication links that can be used include cellular, such as 5G, 4G, 3G, 2G, LTE, CDMA, GSM, HSPA, and other types of cellular radio networks; satellite; 2.4 Gz or 900 MG; Bluetooth; LoRa Technology; and "WiFi." Although any type of wireless network could be used, in a preferred embodiment it comprises a mobile, cellular network. The radio 106 would, in this implementation, be comprised of a mobile cellular data modem. This type of network allows the unit to be easily provisioned for on the wireless network using a SIM card or a similar method.

After the data modem automatically registers with a wireless network 302, the data monitoring unit automatically registers the flood monitoring unit with a remote flood monitoring system 306. The flood monitoring system comprises software programs running on one or more computers. In the alternative, the flood monitoring unit 100 can be programmed or provisioned with the necessary parameters to enable it to communicate. Furthermore, in an alternative embodiment, a flood monitoring unit may connect wirelessly to an access point or gateway to the wireless network 302 (or another type of data network) for multiple flood monitoring units in a geographic area. This might allow low power wireless connections to be used, thus reducing power consumption by a remote flood monitoring unit. Or it might allow deployment in locations that have limited or unreliable coverage by, for example, a mobile cellular network being used by the flood monitoring system for its remote flood monitoring units.

Furthermore, though no particular network or network protocols are required, in each of the embodiments described herein messages between each flood monitoring unit 100 and the remote flood monitoring system 306 are sent using data packets that are formed and forwarded according to the Internet Protocol suite of protocols may provide the greatest flexibility for setting communication links between the flood monitoring units 100 and the flood monitoring system 306.

After the flood monitoring unit connects with the wireless network, it registers with the flood monitoring system at step 408. Registration may include, for example, sending one or more messages, which for this description will be represented by a message referred to as a "registration" message, to the flood monitoring system 306 or, alternatively, to a software implemented provisioning service or system capable of communicating with the flood monitoring unit that is used by the flood monitoring system. Each flood monitoring unit can be, for example, programmed with or store a uniform resource locator that can be resolved to a network address during startup, or with a network address, with which it is to communicate, either during manufacture when being readied for installation or during or after installation in the field. The messages are intended to notify a remote flood monitoring system that the remote monitoring unit is connected and operational. The messages may include identifying information for the flood monitoring unit and, if not previously provisioned, information on how it can be reached. The unit may, as an option, also include the messages additional parameters such as the geographic location of the flood monitoring unit (using longitude and latitude, for example) and, optionally, elevation information. This information may be obtained from the Geolocation system 116. Having each flood monitoring unit capable of reporting this information simplifies installation, maintenance, and operation.

Alternatively, the geographic coordinates and, optionally, elevation or other information that can be used to relate reported measurements of water level to an absolute or reference elevation or height or depth of the water above the ground, can be obtained by an installer or other technician at the flood monitoring station site (or afterward) using a computer (e.g. laptop or tablet computer, smartphone, GPS receiver, survey equipment, and/or other instrument and either reported directly the flood monitoring system 306 (or a provisioning service) or uploaded to the remote flood monitoring unit through wireless connection or physical port for sending to the flood monitoring system or provisioning service. This information is stored by the flood monitoring system and is used by it to schedule communications with each flood monitoring unit, to receive, store, process, and analyze measurement data received from each flood monitoring unit, and to otherwise manage and supervise their operation.

At step 410, the fluid monitoring unit waits for an acknowledgment from the flood monitoring system and, if received, finishes setting up at step 412. If it is not received, the flood monitoring unit may repeat one or more of the initialization, network connection, and/or registration steps or processes represented by steps 402 to 408.

The final setup at step 412 may include, for example, receiving configuration or other types of parameters from the flood monitoring system and storing them. Non-limiting, presentative examples of such parameters may include communication schedules, addresses for messages, triggers for reporting, and other requirements. After finishing the setup, it enters another mode. Examples of such other modes are a standby mode, in which it consumes minimal power and periodically checks with the flood monitoring to determine whether it should start monitoring water levels; or an active mode in which it monitors water levels. Additional modes are possible, such as a maintenance mode, remote update mode, or various types of active modes.

Settings for the flood monitoring unit 100 may be set when the flood monitoring unit is provisioned in the field. The settings may also be set and/or updated remotely from a remote server communicating with the device. Data acquisition and transmission can be, for example, set to occur at regular intervals, in response to a message received from a remote server, and/or in response to sensed environmental conditions. Non-limiting, representative examples of such environmental conditions include detection of water (for example, at a normally dry location); a water level at or above a setpoint (or any of multiple setpoints) as indicated by a single measurement or multiple measurements taken over a given period (such as an average measured level or median measured level); a rising water level or a rate of increase in water established by multiple measurements over a time period that might indicate flooding. A configuration device or an application on a computer or mobile device can be used to download or change the settings by connecting to the water level monitoring device during installation or provisioning in the field.

A local warning unit 303 is, optionally, associated with one or more of the flood monitoring units. In the illustrated example, local warning units 303a, 303b, 303c, and 303d are associated, respectively, with flood monitoring units 200a, 200b, 200c, and 200d. Each unit is comprised of a means for generating an audible and/or visual warnings. A representative, non-limiting example of a means for generating a visual and/or audible warning comprises one or more warning lights and an interface to the associated flood monitoring unit responsive to a signal from the flood monitoring unit that activates and cause the warning to be generated. An example of such a means includes, in a simple form, a relay connected by wire to the associated flood monitoring unit for connecting power to lights on and off the lights in response to a signal received from the associated flood monitoring unit. A siren can also be connected to a power source to generate an audible warning in a similar manner. Electronic communication interfaces and control circuits may be substituted. The interface may, for example, comprise a wired or wireless modem. If using a wireless interface, one or more local warning units can be connected with a flood monitoring unit through a local or personal wireless using any one or more available topologies and layer 1 and 2 protocols, non-limiting examples of which include Bluetooth, Bluetooth low energy, WiFi, and IEEE 802.11. In yet another alternative, the local warning system may use a radio for connecting to the same wireless network as the flood monitoring unit and use that wireless network exchanging messages with the associated flood monitoring unit. Any type of loudspeaker could be substituted for the siren, with a recorded warning being played.

The local warning unit may be separately mounted on the same pole as the flood monitoring unit or in proximity. In an alternative embodiment, the local warning unit or some of its components (such as control circuits) may be placed within or otherwise incorporated into the same enclosure as used for the flood monitoring unit or in an enclosure that is physically attached to the enclosure of the flood monitoring unit. The local warning unit may be connected to a different power source, a battery for example or to an electrical power service, than the flood monitoring unit. It may, alternative, share the same power source as the flood monitoring unit. In one embodiment, the local warning unit is activated directly by the flood monitoring unit in response a triggering condition that is programmed or set, such as sensing water at certain level. The flood monitoring unit may, alternatively, activate the local warning unit only in response to a message or command from the central flood monitoring system 306. In yet another embodiment, the local warning unit can be activated by the floor monitoring unit and the flood monitoring system. Furthermore, if there is a direct connection, the flood monitoring system may active the local warning unit directly, by commanding the flood monitoring unit to do so, and/or by relaying a command to the local warning unit through the flood monitoring unit.

In one example, the remote flood monitoring unit includes a visual display that visually displays an indication of the current conditions or state of the flood monitoring station and/or alerts. For example, the visual display may include one or more LED or other type of light sources, a display screen, or other type of display device that is capable of displaying preconfigured visual indicators. In one example, colors could be used as the preconfigured visual indicators. For example, a red color is displayed when there is a flood or abnormal condition as configured in one or more settings stored by the remote flood monitoring unit's logic or software-implemented processes. A different color, for example yellow or amber, could be displayed when a flood or abnormal condition is possible or is approaching based on the settings that have been configured and stored by the unit. These setting may be based on measured water level and, optionally, other sensors associated with the base station, meet one or more set points that indicate the conditions for possible flooding or other abnormal conditions. Settings that might trigger this type of visual warning include could include, for example, one or more of the following: measured water level, a calculated change in water level or rate of change in water level, rain gauge readings, soil moisture readings, or combinations of any two or more of them. Displaying the color green, for example, could be used to indicate a steady state or normal condition as defined by the user. Water levels below optimal conditions may, optionally, also be indicated by displaying yet another color, such as blue. Instead of colors, other visual indicators of conditions could be used, such generating text that can be read on a display or a signal that could be received by, for example, in vehicle's electronic system, smartphone, computer, watch or other device to cause it to automatically generate a warning message on the display or other visual, audible, or haptic cue to warn of a dangerous or abnormal condition. A change in state or generation of a warning—or a change in measurements that would trigger a warning or change in state— could be communicated to the flood monitoring or trigger a reporting to the flood monitoring system of measurement data.

Figure 5:
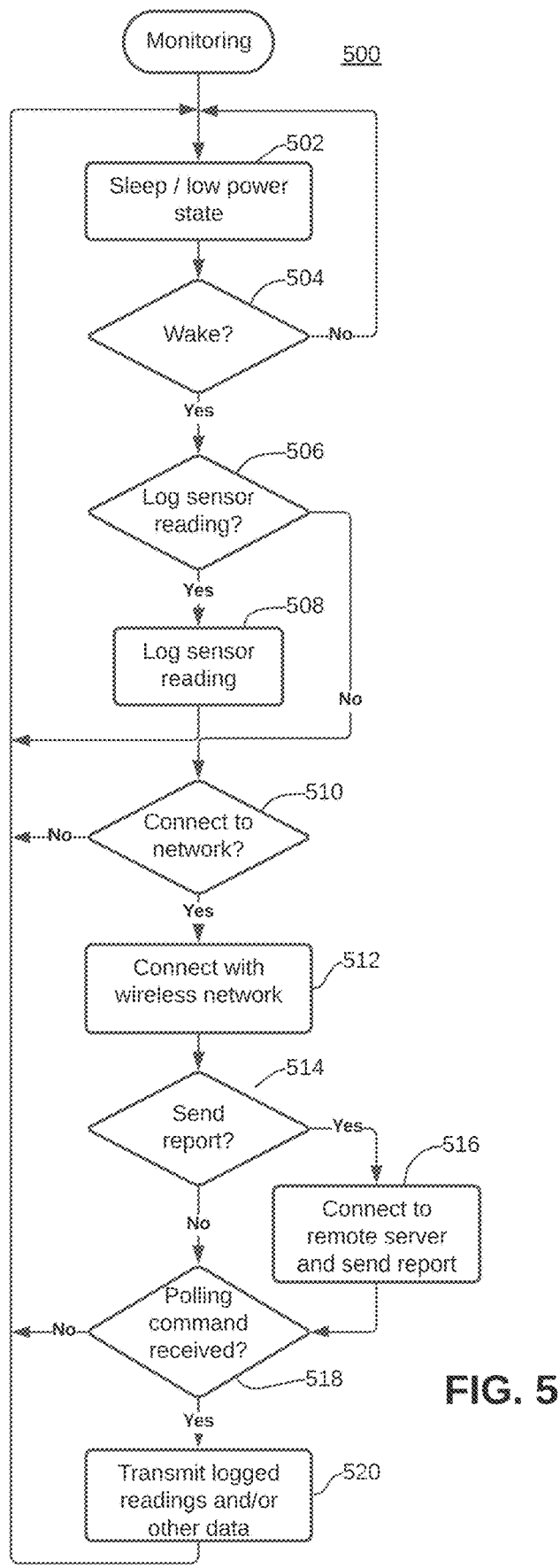
FIG. 5 is a flow diagram of certain steps of a representative example of a monitoring process of a flood monitoring unit.

FIG. 5 is a non-limiting, representative example of basic steps of a monitoring process 500 that flood monitoring unit 100 may perform. To conserve power, it may optionally place itself in a low-power state for purposes of preserving battery power. This is represented by step 502. In this state, the radio 106 may turn off and periodically turn back on, and/or enter a low power (or, possibly, a listening-only state), that enables it to maintain a registration with the network and check to see if it needs to connect.

As indicated by step 504, the remote flood monitoring unit might "wake" for any one or more of several reasons, including log a reading from the sensor, connecting with the wireless network to send or to receive a message, and/or to respond to a triggering event, which may include logging a reading, and/or connecting to the wireless network to receive or send a message. When the flood monitoring unit wakes, it can stay in a lower power mode or switch to another power mode, or switch between two or more states, depending on the reason for waking. Steps 506 to 520 are just one representative example of a process that may occur after waking.

For example, a flood monitoring unit 100 may, optionally, be configured to log sensor readings on a programmed schedule, or at a certain frequency, or both. If the schedule "wakes" the flood monitoring unit to take a reading, as indicated by steps 506 and 508, the flood monitoring unit logs the current sensor reading and returns to the lower power state at step 502. The logging may require powering, initializing, or otherwise causing the sensor measure or sense if, for example, the sensor is normally turned off or placed in a lower power mode between readings and/or when the flood monitoring unit is in a lower-power mode. Logging may not require that the flood monitoring unit exits the lower power made.

If it is waking for a reason requiring connection to the network, as indicated by step 510, the flood monitoring unit will connect to the wireless network at step 512 to (1) transmit a report to the flood monitoring system 306, as indicated by step 516, or (2) receive and then reply to a poll command or to another type of request to read out or otherwise send data, as indicated by steps 518 and 520. Polling is a standard process used in SCADA environments. When polling, a remote server in the flood monitoring system sends a polling command to a remote flood monitoring unit 100 and the remote flood monitoring unit replies by reading out the logged values from the sensor 102 and transmitting them to a remote server over the wireless network. However, the use of SCADA protocols and processes are not required for practicing the process. The flood monitoring unit may, instead, have an API or otherwise be programmed to allow the remote server to request information and the flood monitoring unit may send the requested information in replay.

If the flood monitoring unit is not able to connect or the communication of data or other message from the flood monitoring unit to the remote server or host system otherwise fails, the flood monitoring unity may, optionally, be programmed to make a limited number of additional attempts, such as one or more attempts, to connect and send the data or message. Once the number of retry attempts reaches a limit, the flood monitoring system enters a power conservation or low power mode between scheduled reporting intervals until communication during a scheduled reporting interval is successful. The flood monitoring unit may also change its status to indicate an alarm or low battery. Limiting the number of communication attempts during a scheduled communication period or interval and reducing power consumption will help to conserve battery power until communication is restored.

Requesting data from a flood monitoring unit, such as by polling each flood monitoring unit may, like logging, occur according to a schedule, which specifies windows during which it operates its radio to listen for messages directed to it. A flood monitoring unit may, alternatively, periodically check with the wireless network or remote server to see if it has a message waiting for it. If so, the unit connects and waits for the message to be transmitted. The wireless radio may, alternatively, operate continuously in a listening mode for a transmission indicating that it needs to connect.

Alternatively, the flood monitoring unit may connect to transmit a message to the flood monitoring system 306 that contains a report or a request that it be polled or sent a request for data to the flood monitoring system 306, or to notify the central flood monitoring system 306 that there may be a change in conditions requiring attention. Such a message may be done in response to a triggering event or condition or based on a schedule.

For example, one schedule might have the flood monitoring unit log periodically throughout each a day, at certain times during the day, once a day at a certain time, or less than once a day. Furthermore, a fluid monitoring unit 100 may have one or more preprogrammed alternative schedules that are activated based on the occurrence of one or more conditions or triggering events that it detects or determines. For example, the data acquisition module could switch to a predetermined, alternative schedule or change the schedule if flooding is expected or might be starting, or its recent readings otherwise indicate a need for more frequent or less frequent reading based on preconfigured settings.

The flood monitoring unit may, optionally, be programmed to automatically change logging schedules or frequency of logging in response to a given condition (as indicated by water level sensor readings and/or other situations) or possibly other or event that it detects or determines between polling events and/or when communications are interrupted. Examples of the types of readings that can be used by the flood monitoring unit (and the flood monitoring system) to trigger a change in logging schedules, the frequency of logging and/or reporting included: whether or not water is sensed; whether the level of the water as at or above or below a certain set point (and which set point if there is more than one); how long it stays at or above any given level or set point level; a change in the water level of a given magnitude over a given period and whether it is increasing or decreasing; the rate of change in the water level or an increasing or decreasing rate of change; or a combination of these conditions. The amount of the change to the frequency of logging may also be in relation to one or a combination of these conditions.

A switch to an alternative schedule or a change to the existing schedule may, for example, occur in response to receiving a message from the flood monitoring system 306. This message might be sent in response to or based on one or a combination of any of the following conditions or events: an analysis of the most recent readings of the flood monitoring unit (received during the last polling, for example); current weather conditions, weather forecasts, watches, and warnings; a change in the season; and/or flooding or water levels elsewhere.

Conditions or events that may be used to trigger a sending of a report may include any of the conditions or events that might trigger a change schedules for logging or polling (or sending a request for polling) mentioned above, of an environmental condition using a secondary sensor, or analysis logged sensor readings indicating that report or other communication needs to be sent, such readings indicating flooding, a certain level of water or flooding, or substantial change in the rate of change of water levels.

A triggering event may include any one or a combination of two or more of the following: a change in a status of the flood monitoring unit or one of its parameters indicating an error, failure, need for maintenance, theft, or tampering. For example, a report might be triggered by an interruption or loss of primary power, a low battery level, excessive power consumption, malfunctioning or error message from the sensor or other subsystem; a change in location (as determined by, for example, geolocation system 116), which may indicate theft or other problem; or detection of tampering, such as the opening of the housing assembly or an included enclosure, movement of or shocks to the housing assembly (for example, sensed by a gyroscope), or detection of another type of sensor of unexpected activation, noise, or motion.

In another exemplary embodiment, the flood monitoring unit 100 may further include an optional water detection sensor placed at or near the bottom of a pole such as the signpost 202 that functions to signal if water present without directly measuring its depth. The signal may cause the flood monitoring unit to change the state or mode of operation of the flood monitoring unit and to start a process. Thus, the flood monitoring unit can be placed in a mode in which does not attempt to measure water level with the water level sensor as often, if at all (except perhaps for diagnostic purpose), because there is no water to detect. It can also be placed in a state in which it communicates less, if at all, with the flood monitoring system 306.

The flood monitoring unit 100 may be programmed to respond to the signal by logging the water level from the water level sensor 102, to log water levels more frequently or according to a different schedule or algorithm, and/or to connect to the wireless network to send to or receive from the flood monitoring system 306 (such as a status messages, a message to request polling, or a reporting message). Or it might change to a different state, such as an active state (though, perhaps, still a lower power state) when water is sensed. The logging, polling, and/or reporting schedules or frequencies may, optionally, be changed based on whether there is water present to measure. Preferably, the water detection sensor that uses little power (as compared to, for example, the water level sensor 102). A non-limiting example of such a water detection might be two spaced-apart contacts that, when water is present between them, completes an electrical circuit that causes sending a signal or a change in the state of a signal received by the data acquisition module.

In one example of a process performed by the flood monitoring unit 100, the flood monitoring unit may respond to detection of water (either by the water level sensor 102 or by a water detection sensor) by starting logging according to a predetermined algorithm—for example, a flood monitoring routine for use during active flooding—or a new, predetermined schedule (either programmed or selected from among two or more based on one or more other conditions) in which it logs water levels sensed by the water level sensor 102 and reports or requests polling with greater frequency. It may optionally, or instead, send a message to the flood monitoring system 306. The message to the flood monitoring system 306 may report or include data indicating any one or more of the following: the event (in this case detection of water), the current state of the flood monitoring unit 100, and the battery level and/or other system parameters. The flood monitoring unit 100 may, in the alternative or in addition, also be programmed to change states or modes—for example, enter an active mode or, if it is in an active mode, a watch mode, each of which may have different logging and reporting frequencies. The flood monitoring unit 100 may be programmed not take any further action after sending a message to the flood monitoring system unless an acknowledgment of a response to the message is not received from the flood monitoring system 306 within a predetermined period or there has been a change in conditions, in which case it may execute additional, predetermined processes. It may, for example, frequently log water levels to detect a rising water level while it waits for a response to the message. If no response is received, it may change stay in the same state, revert to the earlier state, or move to a new state depending on the water levels.

The flood monitoring unit may also wake to run diagnostic routines or for maintenance.

In one representative embodiment, the data acquisition module may also check for water levels crossing any one or more set-points or any level change before a scheduled reporting window. It may send alerts as emails and text messages with the same or different information as it would include in a message sent by connecting with the flood monitoring system 306 over the data network. The emails or text messages may be sent for redundancy or to provide additional information if the information is also being sent as data messages over through connection or communication session established with the flood monitoring system 306 over the networks, or as an alternative to such messages or in the event a connection to the flood monitoring system cannot be established or fails.

Parameters that can be, optionally, reported by the data acquisition module to the flood monitoring system may include battery and radio strength indications, and, in addition to water level sensor readings, including the rate of change of water level and status information.

The flood monitoring device may include anti-theft features. For example, the flood monitoring unit may be attached to a pole using fasteners the, in effect, lock the device to the pole that requires the use of special tools or a key. In combination with the unit being disposed on top of the pole, such fasteners will discourage casual attempts to remove the unit. Removal of the unit from its mounting on the pole could also trigger an alarm mode in which the unit sends an alarm signal and periodically reports its location using the optional GPS receiver. For example, the housing assembly may include a physical switch or a proximity detector, the state of which changes when it is mounted to a pole or removed from the pole, or when it is fastened and unfastened to the pole using a fastener or fastening system. In an alarm mode, the unit could, for example, send via the wireless network a message indicating its state and, optionally, its geolocation if it is outfitted with a GPS receiver.

Furthermore, flood monitoring device, the networks over which the communicate, and the servers with which they communicate preferably implement security measures against unauthorized access, interception or interference with communications, and other types of "cyberattacks."

In one embodiment, integrated flood monitoring units are installed over one or more geographic areas and managed by remote servers may provide a ranges of management services to the flood monitoring units in the field. These remote management servers may run one or more processes for performing certain management functions for the flood monitoring units. These functions may include, but are not limited to, tracking, maintaining, updating, troubleshooting, and/or repairing each of flood monitoring units. To perform one or more of these management functions and/or perform the warning generation and functions noted above, the management systems may store one or more attributes, non-limiting examples of which include: a unique identifier for the flood monitoring unit and/or each of its components; location information, such as GPS location, GPS elevation, and a description; information about installation, such as its installation or commission date, who installed; a log of maintenance, which may include, who performed the maintenance, what maintenance was performed, and a description of it; information about the sensor, such as type, manufacturer, model, serial number, classification and length of cable; information about the battery, such as manufacturer, type, model, installer, when it was installed, replacement history, current battery status, and estimated date for replacement; and a log of messages or transmissions to and from the flood monitoring unit.

Figure 6:
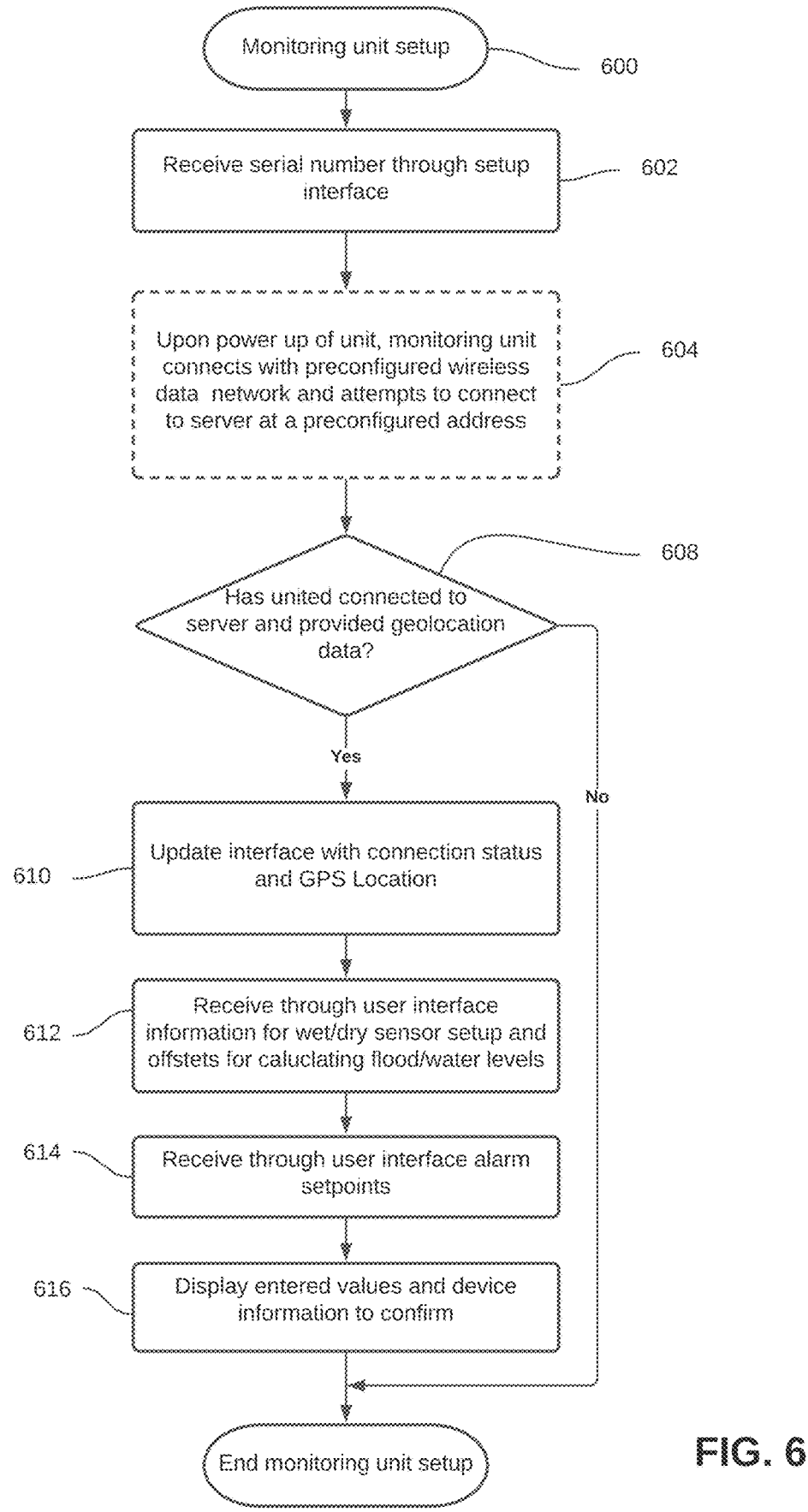
FIG. 6 is a flow diagram of certain steps of a representative example of a setup process for a flood monitoring unit.

Please refer now to FIGS. 6 and 7A-7G. FIG. 6 is a representative example of a set up and configuration process on a remote server of a flood monitoring unit after it has been physically installed that makes use of a computer application on smartphone, tablet, laptop computer, or another type of computing device that an installer has in the field, or a web portal in a web browser running on such a computer device. The application communicates with the configuration process on the remote server and generates the interface. If the web portion is used, the web pages in the web portal are generated by a web server application in communication with the configuration process on the remote server. The process stores the configuration data in a database for use by, for example, a remote flood monitoring system or other application that receives and processes sensor data. FIGS. 7A-7G illustrate web pages in a web portal at different stages of the setup process. However, a dedicated application running on computing device may have substantively similar user interface or it may have a completely different interface. The screens shown in are intended as a non-limiting example of a guided setup process 600 shown in the flow diagram of FIG. 6. The web portal and application may be programmed to guide the installer through the setup process by, for example, changing the interface based on the step, providing prompts, and generating pop-ups to provide help.

Figure 7A:
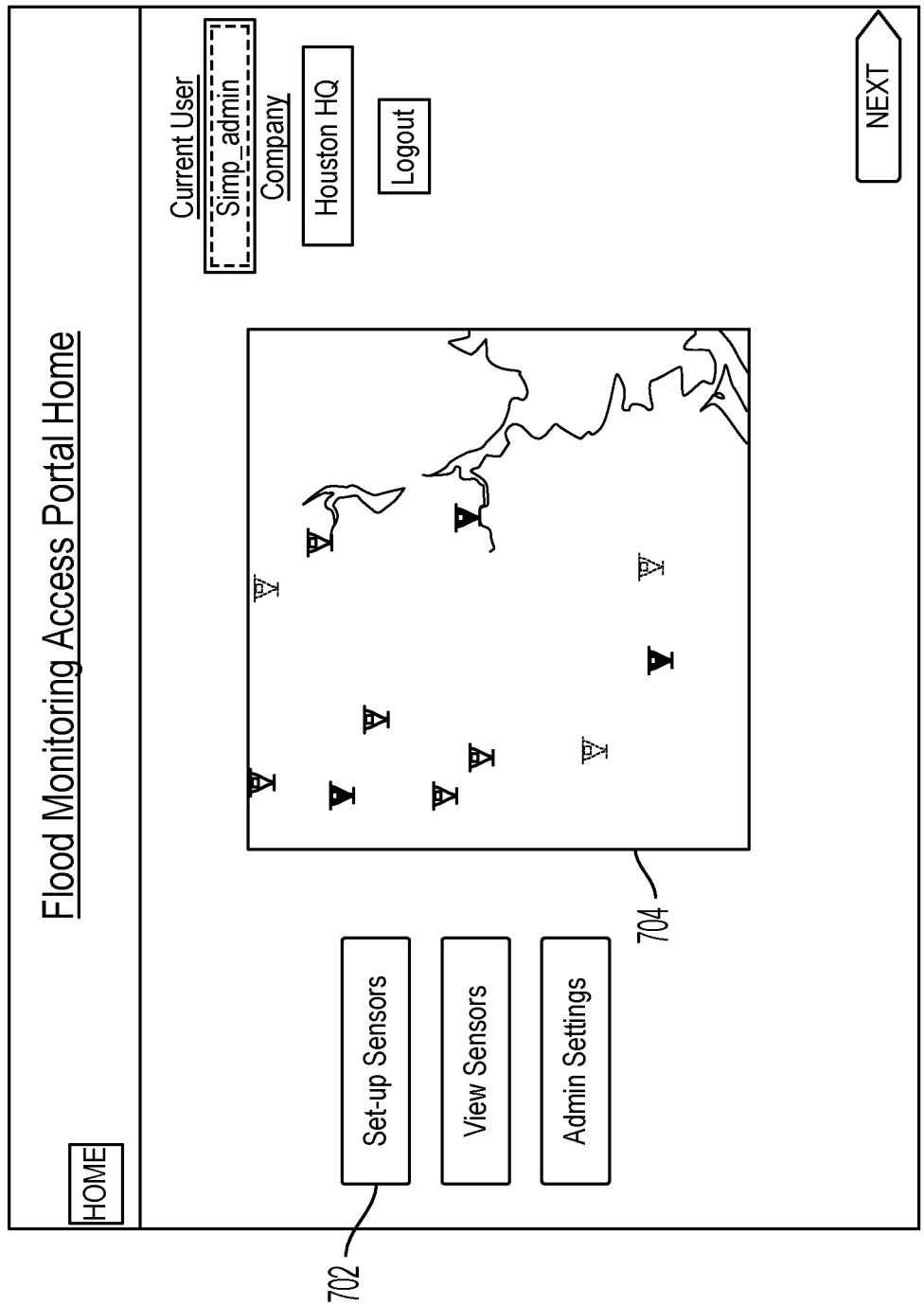

FIG. 7A is an example of a home screen of an embodiment of a customer accessible web-based interfacing "portal" that allows customers to interact with sensor data, initiate and perform onsite sensor setup process 600, and to access information on previously installed sensor. After logging in, an installer selects an object 702 (a button, menu item, dropdown list, for example) to initiate the sensor set up process, which then generates an interface like the one shown in FIG. 7B. A code, such as QR code, provided in connection with the monitoring a unit could also be used to initiate the process directly with or without logging in. If the user does not have an account, the process may allow creating of an account using a unique username and password.

The home screen shown in FIG. 7A may, optionally, also include, for example, an interactive map 704 on which is indicate the location of previously installed monitoring units of a customer using a graphical object. The color or other attribute of the object may to indicate the status of the sensor. For example, using the previously described colors, red could indicate an alarm state, yellow a warning state, green a normal/healthy state, and grey an offline state.

Figure 7B:
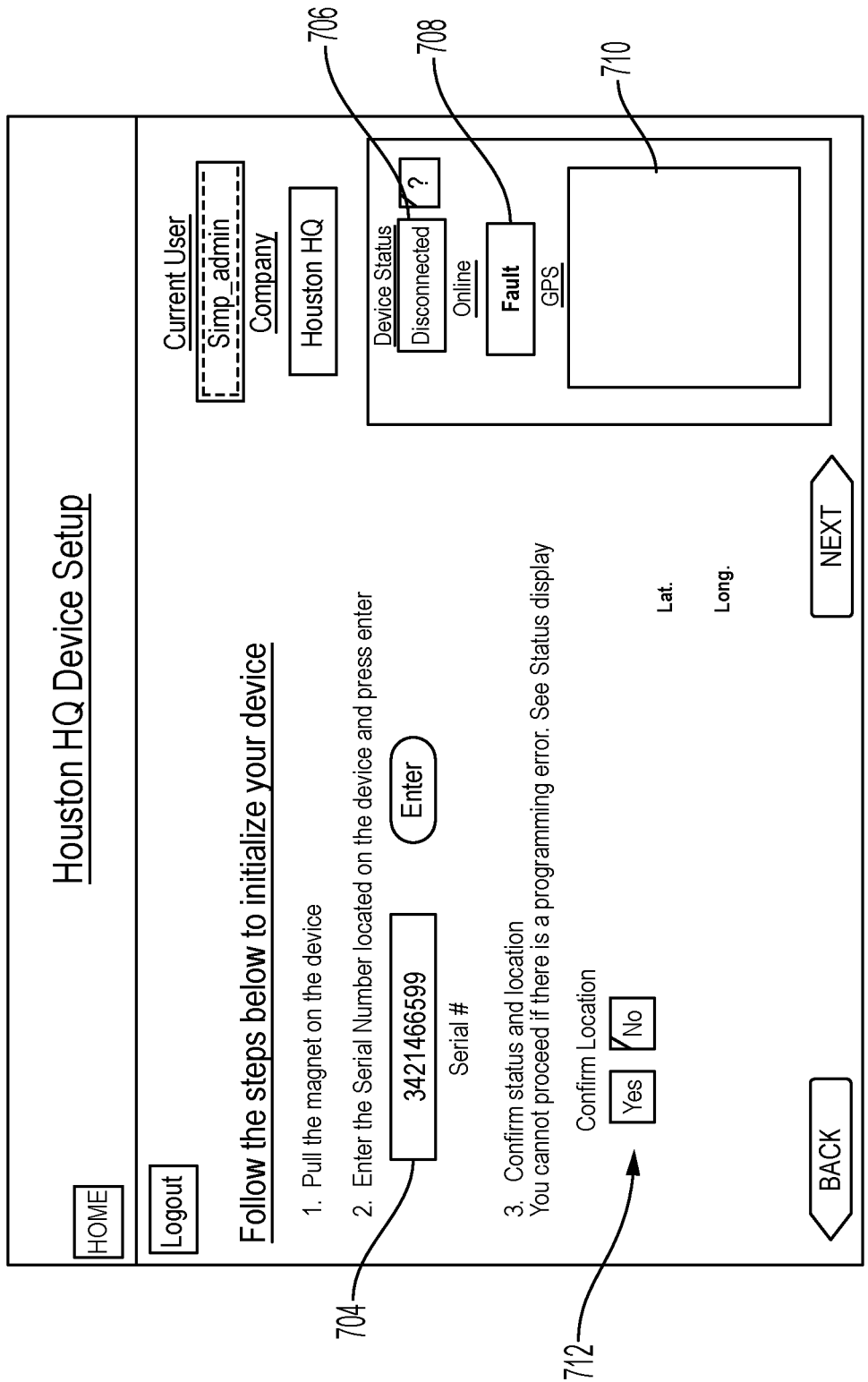
Figure 7D:
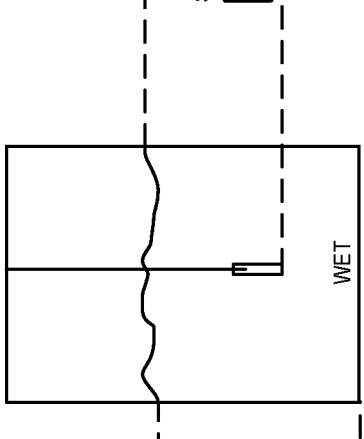
Figure 7F:
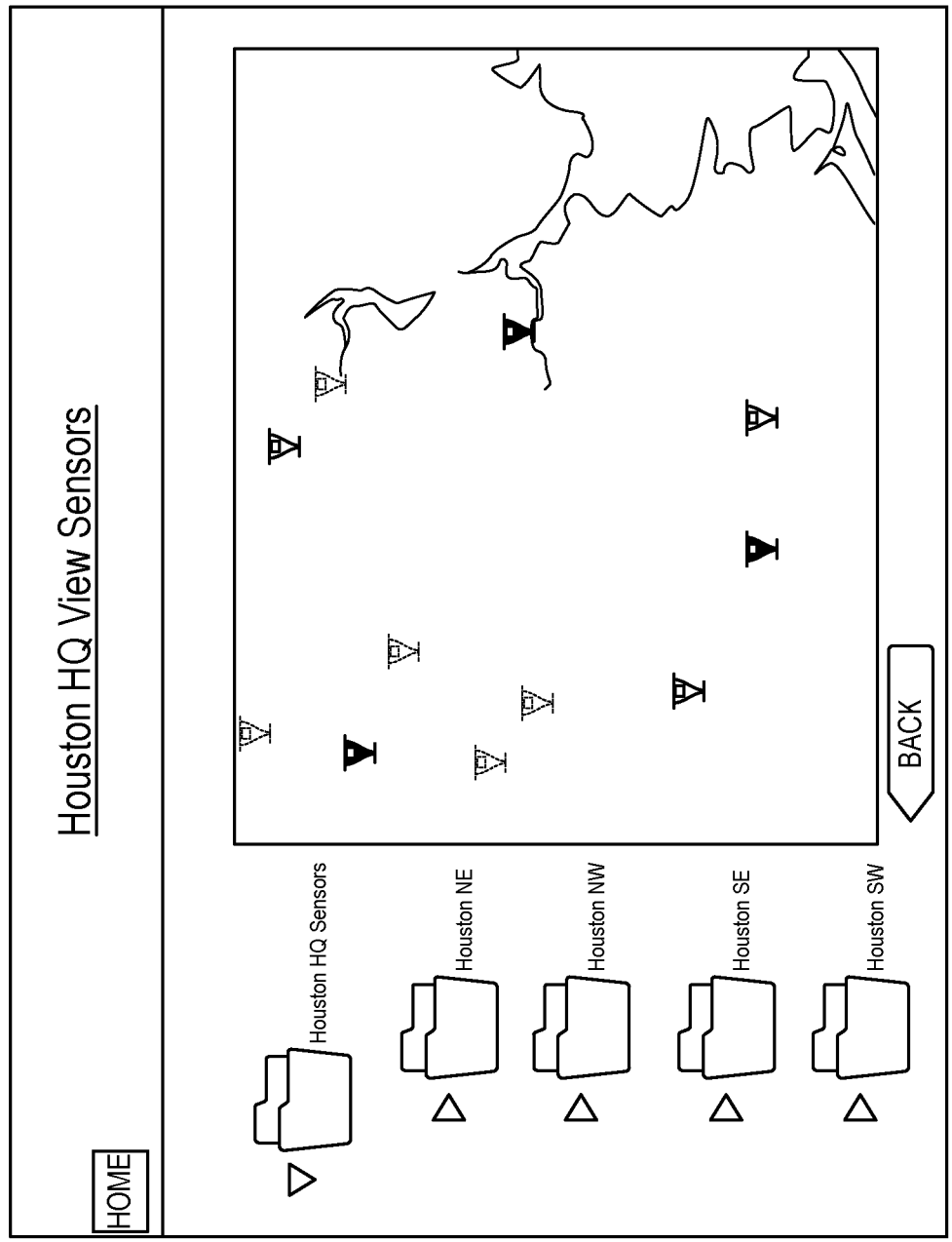
Figure 7G:

At step 602, a unique serial number or other unique identifier that has been previously assigned to and stored by the flood monitoring unit that is being installed is entered in field 704 (FIG. 7B). This unique identifier and certain attributes of the flood monitoring unit could already be stored in a database that the remote setup and configuration process uses to store setup and configuration information. The installer can select from a drop-down menu or in some other way, or it could be typed in manually. The identifier and related attributes of the unit could be pulled in by the setup process 600 from another database storing this information prior to the installation so that it is available for selection. Alternatively, or in addition, in response to the unique identifier being read, for example, from a QR code, RF tag, chip, or other device storing the identifier, the remote server may verify the unique identifier and pull into its database any attributes of the unit that are available and display the unique identifier.

As indicated by step 604, the installer is prompted to power cycle the unit by pulling a tab, turning it, or otherwise activating it cause it to go through be a startup process in which its radio connects to a wireless network that the unit has already been configured to connect to. Its communication processes then attempt to make a data connection connect with a communication process at the remote server using a previously stored URL or network address for the remote server running the setup and configuration process. As indicated by steps 608, 610, and 612, once the remote monitoring unit connects to the server and sends its geolocation over the wireless connection, the setup and configuration process updates in the setup interface the connection status 706 and the geolocation 708 of the unit. The location may also be displayed on map 710, which allows the installer to confirm whether the geolocation is correct by selecting a button 712 or another interface object.

At step 614, the setup and configuration process displays an interface shown in FIG. 7C, in which details the setup can be entered that allow calculation of an actual flood or water level based on a reference elevation. These details include the type of installation and offsets, which are differences in elevation between the sensor that is being used to measure and a reference level. For example, a dropdown menu 714 can be used to select whether the unit is located in place where there is normally water ("wet") or where water is not normally present ("dry"). In a wet installation, the sensor is placed in the water ("wet"), or whether the sensor is at a location that is normally dry. In a wet installation, the sensor, for example a pressure sensor, is normally placed below the water line as indicated by the diagram 718 in FIG. 7D. In dry installation, the sensor can be placed above the level grade or below it, as indicated by the FIG. 716 shown in the setup screen shown in FIG. 7C. Offsets are also entered. In the case of a dry installation, shown in FIG. 7C, the distance of the sensor above or below the level grade is entered by selecting the appropriate "above grade" or "below grade" buttons 720 and entering value. The sensor for an above grade installation could be, for example, a guide wave radar sensor and the sensor for a below grade installation could be, for example, a pressure sensor. In the wet setup of FIG. 7D, the offset is the depth of the sensor below the water line. The actual water levels are calculated by processes on the remote server based on the type of installation and the offsets.

At step 614, alarm set points are set. What alarm set points are needed depends on whether it is a wet or a dry installation. The interface for enter set points for a wet installation are shown in in FIG. 7D. Wet installations may have one or more receding level set points—Low 1 (L1) and Low 2 (L2) in the illustrated example—expressed as a distance above or below the water level at the time of installation, as one or more ascending level set point option to allow for water level maintenance.

As indicated by step 616, the process displays after putting the unit through a final power cycle a summary of information that has been entered or generated in connection with the setup, an example of which is shown in FIG. 7E.

In this embodiment, all alarms or statuses relating to water levels are generated based on the water level calculations performed by remote processes and not by the flood monitoring unit. The remote processes may be configured using the web portal or other interface to alert a customer or user of a change of status buy via email, SMS-text, voice, API call, or other means. The statuses of all the units and their location can be, for example, indicated in a map view, such as the one shown in the representative web portal overview page shown in FIG. 7F, and detailed status information for a unit can be viewed on, for example, a web portal page like the one shown in FIG. 7G.

The foregoing description is of exemplary and preferred embodiments. The invention, as defined by the appended claims, is not limited to the described embodiments. Alterations and modifications to the disclosed embodiments may be made without departing from the invention. The meaning of the terms used in this specification are unless expressly stated otherwise intended to have ordinary and customary meaning and are not intended to be limited to the details of the illustrated or described structures or embodiments.

What is claimed is:

1. A remote flood monitoring system, comprising:
   one or more servers;
   a plurality of remote flood monitoring units installed at multiple locations in at least one geographic area for monitoring flooding in the at least one geographic area, the plurality of remote flood monitoring units comprising at least a first remote flood monitoring unit at first location and a second remote flood monitoring unit at a second location;
   wherein each of the plurality of flood monitoring units comprises;
   a sensor being adapted for measuring water levels;
   a data acquisition module coupled with the sensor, the data acquisition module adapted for receiving and storing readings from the sensor and sending readings to the one or more servers;
   a radio configured for transmitting over a wireless network data from the data acquisition module being sent to any one of the one or more servers; and
   a housing assembly comprising at least one enclosure for the data acquisition module;
   wherein the one or more servers are configured to run one or more processes for receiving readings sent from the plurality of flood monitoring units, generating alerts based on the readings, and displaying the locations of the plurality of flood monitoring units on a map representing the at least one or more geographic areas;
   wherein the sensor of the first remote flood monitoring units is mounted at the first location at a first elevation and the data acquisition module and the radio of the first remote flood monitoring unit are mounted at a higher elevation than the its sensor; wherein the sensor of the second remote flood monitoring unit is mounted at the second location at a second elevation and the data acquisition module and the radio of the flood monitoring unit are mounted at a higher elevation than its sensor;
   wherein the one or more processes are configured determine of the first elevation using a reference elevation received for the first remote flood monitoring unit and an offset received for the sensor of the first remote flood monitoring unit.

2. The remote flood monitoring system claim 1, wherein each of at least one of the plurality of flood monitoring units further comprises a housing that encloses an assembly comprised of the sensor, the data acquisition module, and the wireless transmitter form an assembly, the housing being specially configured for mounting at least partially inside of a hollow pole and extending partially through an opening in the top of the pole.

3. The remote flood monitoring system of claim 2 wherein the sensor of the at least one of the plurality of flood monitoring units is adapted to be supported nearer to a lower end of the pole.

4. The remote flood monitoring s system of claim 2, wherein the sensor and housing of the at least one of the plurality of flood monitoring units is configured to allow for insertion of the sensor through an open top end of the pole, with the housing at least partly fitting on or within the open top end of the pole.

5. The remote flood monitoring system of claim 4, wherein the sensor of the at least one of the plurality of flood monitoring units is inserted first and then connected to an electronics enclosure or preassembled into a single system that can be inserted without requiring additional connections to speed up and/or simplify installation in the field.

6. The remote flood monitoring system of claim 1 wherein the data acquisition module of each of the plurality of remote flood monitoring units is configured upon activation to connect to a predetermined wireless network and automatically transmit one more messages over the wireless network to the flood monitoring system to register with the remote flood monitoring unit with the flood monitoring system.

7. The remote flood monitoring system of claim 6, wherein the data acquisition module of each of the plurality of flood monitoring units is configured to register with the flood monitoring system by sending a unique identifier and a location.

8. The remote flood monitoring system of claim 1, wherein the first flood monitoring unit further comprises a geolocation system for determining the flood monitoring unit's geographical location for reporting to the flood monitoring system its geographical location.

9. The remote flood monitoring system of claim 8, wherein the geolocation system of the first remote flood monitoring unit determines an elevation of the flood monitoring unit, wherein registration data sent by the flood monitoring unit includes the elevation, and wherein the one or more processes are adapted to use the elevation as a reference elevation.

10. The remote flood monitoring system of claim 2, wherein the sensor and the housing of at least one of the plurality of remote flood monitoring units have a predetermined spatial relationship.

11. The remote flood monitoring system of claim 1, wherein each of the plurality of flood monitoring units further comprises a battery for powering at least the data acquisition module and sensor.

12. The flood monitoring system of claim 1, wherein the first elevation in normally dry and the first remote flood monitoring unit is configured not to transmit sensor readings unless water is detected.

13. The remote flood monitoring system of claim 1, wherein the sensor of the second remote flooding monitoring unit is comprised of a pressure sensor installed below a water line of a body of water and the second remote flood monitoring unit is configured not to transmit sensor readings unless readings indicate a water level is below a predetermined water level.

14. The remote flood monitoring system of claim 1 wherein the sensor of each of the first and second remote flood monitoring units is a pressure sensor and the plurality of remote flood monitoring units comprises third remote flood monitoring unit, the sensor of the third remote flood monitoring unit comprising a wave guide radar sensor placed at a third location above a body of water at a third elevation.

* * * * *